United States Patent [19]

McNinch, Jr.

[11] Patent Number: 4,748,863
[45] Date of Patent: Jun. 7, 1988

[54] FLUID ACTUATED SHIFT BAR HOUSING ASSEMBLY

[75] Inventor: Joseph H. McNinch, Jr., Livonia, Mich.

[73] Assignee: Eaton Corporation, Cleveland, Ohio

[21] Appl. No.: 26,915

[22] Filed: Mar. 17, 1987

[51] Int. Cl.$^4$ .................... F16H 3/22; B60K 20/00
[52] U.S. Cl. ................................ 74/335; 74/346; 74/477; 74/DIG. 7
[58] Field of Search .............. 74/335, 346, 473 R, 74/477, 364, DIG. 7

[56] References Cited

U.S. PATENT DOCUMENTS

| | | | |
|---|---|---|---|
| 2,206,221 | 7/1940 | Carter | 74/346 |
| 3,664,470 | 5/1972 | Beech et al. | 74/335 |
| 4,415,786 | 11/1983 | Takada et al. | 74/DIG. 7 |
| 4,440,037 | 4/1984 | Foxton et al. | 74/331 |
| 4,445,393 | 5/1984 | Braun | 74/DIG. 7 |
| 4,555,959 | 12/1985 | Braun | 74/334 |
| 4,592,249 | 6/1986 | Lehmann et al. | 74/DIG. 7 |

Primary Examiner—Lawrence Staab
Attorney, Agent, or Firm—A. E. Chrow

[57] ABSTRACT

Provided is a transmission gear change shift bar housing assembly (100) that features a pair of shift bars (18, 24) respectively slidably disposed within bores (7, 9) in a housing (4) that are respectively attached to pistons (14, 22) that respectively define fluid pressurizable chambers (A, B and D) with chambers (A) and (D) being in fluid communication with each other in conjunction with and end housing (38) having an enlarged fluid pressurizable chamber (C) containing an enlarged piston (42) engagable with piston (14) and a fluid pressurizable chamber (E) in fluid communication with piston (22) such that selective pressurization of one or more of chambers (A, B, C, D and E) is able to move shift bar (18) between a neutral position (N) and two axial displaced positions (P$_1$, P$_2$) and to move shift bar (24) between a neutral position (N) and an axially displaced position (P) with enlarged piston (42) and chamber (C) operative to apply increased force against piston (14) for effecting rapid and positive shifting.

7 Claims, 2 Drawing Sheets

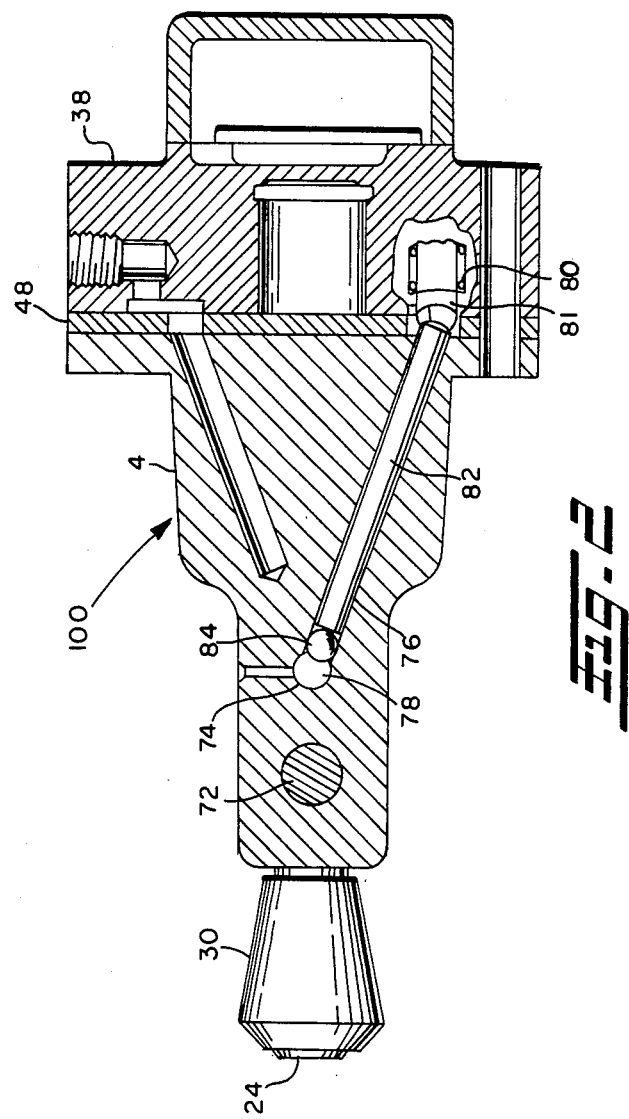

FLUID ACTUATED SHIFT BAR HOUSING ASSEMBLY

BACKGROUND OF THE INVENTION

1. Field of the Invention

The present invention relates generally to fluid actuated shift bar housing assemblies for change gear transmissions and particularly to fluid actuated shift bar housing assemblies wherein selectively applied fluid pressure is effective to urge all of the shift bars into a neutral axial position, or to urge a selected one of the shift bars into at least one selectable axially displaced position for engaging a selected transmission gear ratio. More particularly, the present invention relates to a fluid actuated shift bar housing assembly, preferably actuated by a compressible fluid such as compressed air or the like, having a pair of shift bars each having an axially neutral position with one having a first axially displaced position wherein the shift bar is axially displaced from the neutral position in a first axial direction and a second axially displaced position wherein the shift bar is axially displaced from the neutral position in a second axial direction and the other shift bar having an axially displaced position whereby the shift bar is axially displaced from the neutral position. The housing associated with the shift bars has an actuating portion comprising five selectably pressurizable chambers for urging said shift bars into any one of the five selectable axial positions thereof.

2. Description of the Prior Art

Shift bar housing assemblies having a plurality of axially moveable shift bars, also known as shift rails and shift rods, each carrying or associated with a shift fork, that are selectively axially moved to engage or disengage a selected transmission gear by axial movement of a clutch member, or of a gear carrying clutch teeth, are well known in the prior art, as may be seen by reference to U.S. Pat. Nos.: 3,105,395; 3,611,823; 4,152,949; 4,194,410; and 4,445,393, all of which are assigned to the assignee of this invention and are incorporated herein by reference.

Fluid actuated shift bar housing assemblies, usually actuated by pressurized hydraulic fluid or pressurized air, and the controls therefor, are also well known in the prior art, as may be seen by reference to U.S. Pat. Nos.: 2,924,111; 2,931,237; 2,932,371; 2,943,502; 2,943,719; 2,974,766; 4,440,037; and 4,445,393, all of which are assigned to the assignee of this invention are incorporated herein by reference.

While the prior art fluidly actuated shift bar housing assemblies are generally satisfactory and are presently widely utilized, usually for remotely controlled and/or automatically controlled change gear transmissions, the prior art assemblies were not totally satisfactory as they were complicated and/or expensive to produce, install and/or service, and/or utilize springs or other means to center the shift rails in a neutral position which means tended to shift the transmission into neutral in the event of a loss of pressurized fluid which might undesirably render the driven device totally unusable. Due to space limitations and standardization and mass production practice, prior art shift bar housing assemblies are limited in their ability to provide large fluid chambers effective when pressurized to move at least one of the shift bars axially with great force. An example of a shift rod housing assembly that, although effective for its particular purpose, is limited in its ability to apply a large fluid pressure force against shift rod 144 is shown as actuator 152 in FIG. 1 of U.S. Pat. No. 4,555,959, assigned to the assignee of this invention and the disclosure of which is incorporated herein by reference.

SUMMARY OF THE INVENTION

Accordingly, it is an object of this invention to provide a new and improved shift bar housing assembly particularly advantageous for use for selectively engaging and disengaging transmission change gears.

It is another object of this invention to provide a fluid pressure actuated shift bar housing assembly that is operative to retain engagement of a selected transmission change gear upon loss of fluid pressure.

It is still another object of this invention to provide a fluid pressure actuated shift bar housing assembly that is inexpensively operative to provide increased fluid pressure force for moving at least one of the shift bars rapidly between axially displaced positions.

This and other objects and advantages will become apparent from a reading of the description of the preferred embodiment taken in connection with the attached drawings.

BRIEF DESCRIPTION OF THE DRAWINGS

FIG. 2 shows a cross-sectional view along line 2—2 taken through assembly 100 of FIG. 1 showing a portion of sensing means preferably included for providing a signal indicating when the shift bars are in their respective neutral positions.

DESCRIPTION OF THE PREFERRED EMBODIMENT

Figure 1:
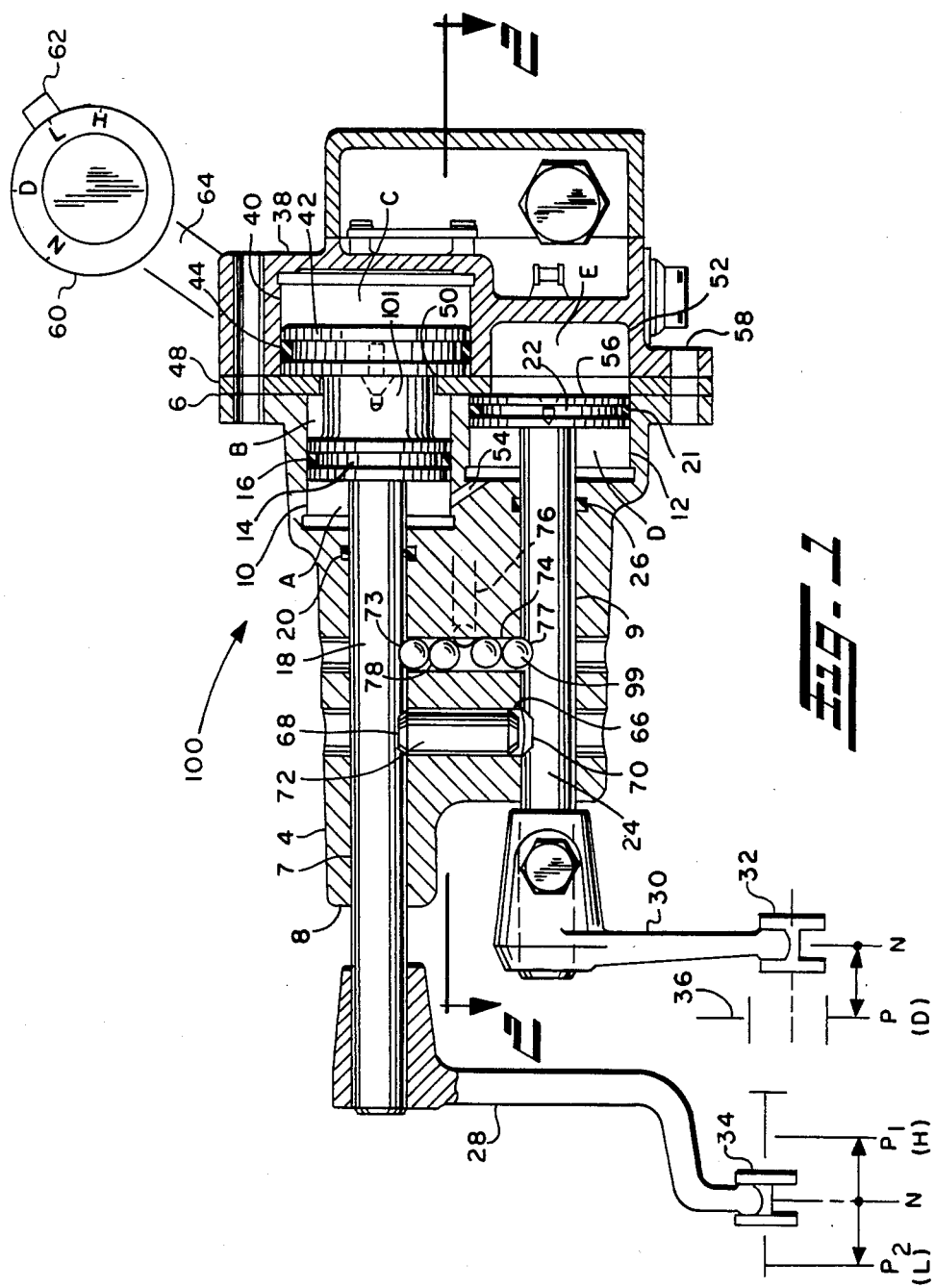
FIG. 1 is a cross-sectional side view of a preferred embodiment of a shift bar assembly 100 made in accordance with the invention in conjunction with partial schematics portraying transmission shift forks positionally controlled by the shift bars and fluid pressure valve means operative to selectably pressurize and exhaust fluid pressure chamber within the housing assembly.

In this disclosure, certain terminology will be used for convenience and reference only and will not be limiting. For example, the terms "forward" and "rearward" will refer to directions forward and rearward of the transmission or transmission shift bar housing assembly as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus being described. The terms "upward" and "downward" will refer to directions as taken in the drawings in connection with which the terminology is used. All foregoing terms include the normal derivatives and equivalents thereof.

In FIG. 1, shift bar housing assembly 100 has a shift bar housing 4 having a first end 6 and an opposite second end 8. Shift bar housing 4 has spaced-apart first and second piston bores 10 and 12 extending respectively thereinto from end 6. First and second shifting pistons 14 and 12 are slidably and sealing received in bores 10 and 12 respectively.

Shift piston 14 defines respective first and second pressurizable fluid chambers A and B on opposite sides thereof within bore 10 and shifting piston 22 defines pressurizable fluid chamber D within bore 12 on a side thereof facing towards the viewer's left in FIG. 1.

Shifting pistons 14 and 22 are respectively provided with suitable seals such as O-rings 16 and 21 in their outer peripheries to provide a fluid tight seal with the inner wall of bore 10 and bore 12 respectively.

At least one channel 54 extends between fluid chambers A and D to provide fluid communication therebetween such that both are substantially simultaneously pressurizable and exhaustible as hereinafter described.

Housing 4 has a first shift bar bore 7 extending therethrough between end 8 and bore 10. A shift bar 18 is slidably received in bore 7 and housing 4 preferably includes a resilient seal such as O-ring 20 to provide a fluid tight seal between the outer periphery of shift bar 18 and the inner wall of bore 7.

Shift bar 18 extends into and through bore 7 from end 8 and is secured to shifting piston 14 which, along with bore 10, is preferably substantially coaxially aligned with bore 7.

A shift yoke 28 is secured to the left end of shift bar 18 and engages a shift collar 34, which may be a gear clutch or other suitable means enabling opposite axial movement of fork 28 to selectively engage transmission gears as hereinafter described.

Housing 4 has a second shift bar bore 9 that is spaced-apart from bore 7 and extends between end 8 and bore 12. Bores 7 and 12 are preferably substantially parallel with each other and bore 12 is preferably substantially coaxial with bore 9.

A second shift bar 24 is slidably received in bore 9. Shift bar 24 extends into and through housing 4 from end 8 with its end secured to shifting piston 22 as shown in FIG. 1. A second shift yoke 30 is secured to the exposed left end of shift bar 24 which engages a shift collar 32 which, like collar 34, may be a shift rail clutch whose axial movement is operative to engage selected transmission change gears.

Assembly 100 includes an end housing 38 secured to end 6 of housing 4. Preferably, a plate 48, hereinafter described, is disposed intermediate end 6 on end housing 38 as shown in FIG. 1.

Housing 38 has a third piston bore 40 extending thereunto from the side of housing 38 facing towards end 6 of housing 4. Bore 40 is preferably coaxially aligned with bore 10. A third shifting piston 42 is slidably and sealingly received in bore 40 defining a fourth pressurizable fluid chamber C within bore 40 on a side of piston 42 facing away from piston 14. Piston 42 is provided with a suitable seal such as O-ring 44 in its outer periphery to provide a fluid tight seal between the outer periphery of piston 44 on the inner wall of bore 40. Piston 42 is able to engage piston 14 yet is independently axially movable relative thereto.

End housing 38 has a second bore 52 extending thereinto from the side of housing 38 facing towards end 6 of housing 4. Bore 52 defines a fifth pressurizable fluid chamber E which is in fluid communication with the side of piston 22 facing away from fluid chamber D.

Although end housing 38 may be secured to shift bar housing 4 in any suitable manner, preferably they are bolted together by means of bolts, not shown, that extend through aligned openings such as openings 58 (only one referenced).

The diameter of piston 42 is greater than the diameter of bore 10 enabling both piston 42 and fluid chamber C to have larger diameters than piston 14 and fluid chambers A and B respectively which provides a large surface of piston 42 facing towards fluid chamber C on which pressurized fluid in chamber C can impinge against to exert a large force and cause pistons 42 and 14 to move axially towards the viewer's left in FIG. 1.

Preferably, the diameter of bore 40 is able to be greater than the diameter of bore 10 by including plate 48 between end 6 and end housing 38 before they are secured together. Plate 48 is provided with a first opening 50 therethrough adapted to enable pistons 14 and 42 to engage each other. Opening 50 is preferably circular and has a diameter that preferably is smaller than the diameter of bore 10 and larger than the extension 101 of piston 14 which engages piston 42. Plate 48 has a second opening 56 therethrough providing fluid communication between fluid chamber E and the side of piston 22 facing towards chamber E. It will be noted that plate 48 provides a stop for pistons 42 and 22 to establish neutral positions for shift bars 18 and 24.

According to which fluid chambers are pressurized, pistons 42 and 14 are operable to move shift bar 18 in opposite axial directions in bore 7 from its neutral position shown by reference N to either of opposite axially displaced positions $P_1$ or $P_2$.

Piston 22 is operable to move shift bar 24 axially in bore 9 between a displaced position P and its neutral position shown as N.

Assembly 100 preferably includes interlocking means for locking one of shift bars 18 and 24 in its neutral position while the other is moving axially. Preferably, the neutral position interlocking means comprises a first bore 66 extending between shift bar bores 7 and 9 within housing 4 as shown in FIG. 1. Shift bars 18 and 24 include grooves 68 and 70 in their respective outer surface which face towards and align with bore 66 when shift bars 18 and 24 are in their respective neutral positions.

A movable locking member such as locking pin 72 is slidably received in bore 66. Pin 72 has a length and ends adapted in conjunction with grooves 68 and 70 such that when either of shift bars 18 and 24 is moved from its neutral position, it urges pin 72 into the groove of the shift bar not being moved at the time which locks it in its neutral position and likewise does not permit both of shift bars 18 and 24 to be out of their respective neutral positions at the same time.

Assembly 100 also preferably includes neutral position sensing means for providing a signal when either or both shift bars 18 and 24 are in their respective axial neutral positions.

The neutral position sensing means is preferably provided by a second bore 74 extending between shift bar bores 7 and 9 in spaced-apart relationship with first bore 66 as shown in FIG. 1. Shift bars 18 and 24 are provided with respective grooves 73 and 77 that face towards and align with bore 74 when shift bars 18 and 24 are in their respective neutral positions.

A second bore 76 intersects bore 74 as shown in FIG. 1 and in more detail in FIG. 2. A movable sensing member such as rod 82 and ball 84 are slidably received in bore 76 with bore 84 being resiliently biased partially into bore 74 by suitable biasing means such as coiled spring 80 shown partially in FIG. 2. In practice, due to directional complexities, one or more additional movable sensing members such as rod 81 may be used to provide a biased movable linkage whose movement is indicative of whether either or both the shift bars are in their respective neutral positions. Although a separate ball 84 is preferred for intersecting bore 74, the end of rod 82 may be shaped to provide the type of interface contact within bore 74 desired.

In FIG. 1, first and second movable members are respectively slidably disposed on opposite sides of ball 84 within bore 74. The first movable member preferably comprises a pair of balls 78 disposed between ball 84 and groove 73 of shift bar 18 and the second movable member preferably comprises a pair of balls 99 disposed in bore 74 between ball 84 and groove 77 in shift bar 24.

Grooves 73 and 77 are respectively adapted that when either shift bar 18 and 24 is moved from its neutral position it will urge the respective movable member within bore 74 against ball 84 which in turn will urge ball 84 away from bore 74 causing movement of rod 82 that can be utilized as a neutral position sensing signal.

Assembly 100 includes valving means connectable to a source of pressurized fluid for selectively pressurizing and exhausting fluid chambers A-E as hereinafter described. Such valving means is shown by reference 60 in FIG. 1 which includes a positionable member 62 for selecting any one of four different positions for shift bars 18 and 24. Since, as earlier described, fluid chambers A and D are in fluid communication with each other by means of channel 54, only four three-way valves, well known to those skilled in the art, may be used for operating assembly 100. The particular fluid conduit interconnection between valve means 60 and fluid chamber A or D and B in housing 4 and fluid chambers C and E in housing 38 are not shown but rather referred to by general reference 64.

As previously described, shift bar 18 has three axial positions and is shown in FIG. 1 in its neutral position N intermediate between axial displaced positions $P_1$ and $P_2$ which, if desired, may represent engagement of low and high transmission change gear ratios (not shown).

Shift bar 24 is axially movable between a displaced position P and its neutral position shown in FIG. 1. Position P may represent engagement of a drive or D transmission change gear ratio such as by engagement of gear 36 shown in FIG. 1.

Thus, for illustrative purposes, assembly 100 is operative to selectively move shift bar 18 from its neutral position for engagement of either low or high transmission change gear ratio or selectively lock shift bar 18 in its neutral position and move shift bar 24 axially from its neutral position to engage a drive or D transmission change gear ratio which positions are shown as N, D, L and H on valve means 60 in FIG. 1.

The preferred fluid pressurization and exhausting relationship of chambers B, C, D, E and A simultaneously with chamber D is is shown in following Table I.

| Selected Valve Position | CHAMBERS | | | |
|---|---|---|---|---|
| | A/D | B | C | E |
| N | + | − | + | − |
| D | − | − | − | + |
| L | − | + | + | − |
| H | + | − | − | − |

Where + denotes pressurized and − denotes exhausted conditions with the actual value of peak fluid pressure being suitable to enable assembly 100 to selectively engage and disengage transmission change gear ratios in the manner desired. 50-100 psg fluid pressure is commonly employed for such purpose.

Thus, when chambers A and D are simultaneously pressurized in conjunction with chamber C, one or the other of the shift bars (18 and 24), if displaced, is moved axially to its axial neutral position since the other is already there due to the neutral position interlocking between the two.

When chamber E is pressurized, shift bar 24 is caused to move axially from its neutral position to displaced position P (D) whilst shift bar 18 remains in its neutral position.

When chambers B and C are pressurized shift bar 18 is caused to move axially from its neutral position to axially displaced position $P_2$ (L) whilst shift bar 24 is held in its axially neutral position.

When chambers A and D are pressurized, shift bar 18 is moved axially from its neutral position to axial displaced position $P_1$ (H) whilst shift bar 24 is held in its axially neutral position.

The assembly of the invention provides a simple and economic way of utilizing five fluid chambers of which two are in fluid communication with each other to provide five axial positions for two shift bars for selectively engaging and disengaging three different transmission change gear ratios in addition to providing an enlarged piston and fluid chamber outside of the main shift bar housing that is operative to provide increased force in moving the shift bars from neutral to and from axially displaced positions.

Although this invention has been described in its preferred form with a certain degree of particularity, it is understood that the present disclosure of the preferred embodiment has been made only by way of example, and that numerous changes in the detailed construction in combination and arrangement of the parts may be resorted to without departing from the spirit and the scope of the invention, as hereinafter claimed.

What is claimed is:

1. A pressurized fluid operated shift bar assembly for a change gear transmission, said assembly comprising:
   a shift bar housing having spaced-apart first and second ends;
   a first piston bore having a prescribed diameter extending into said shift bar housing from the first end thereof;
   an open-ended first shift bar bore extending through the shift bar housing between the first piston bore and the shift bar housing second end;
   a second piston bore extending into the shift bar housing from the first end thereof in spaced-apart relationship to said first piston bore and having a prescribed diameter;
   an open-ended second shift bar bore extending through said shift bar housing between the second piston bore and the shift bar housing second end in spaced-apart relationship to said first shift bar bore;
   a first shift bar extending through the first shift bar bore into the first piston bore from the shift bar housing second end and slidable in axially opposite directions relative thereto, said first shift bar having an axially neutral position and first and second axially displaced positions;
   a second shift bar extending through the second shift bar bore into the second piston bore from the shift bar housing second end and slidable in axially opposite directions relative thereto, said second shift bar having an axially neutral position and an axially displaced position;

a first shift yoke operatively connected to the first shift bar adjacent the shift bar housing second end and moved thereby to effect engagement of a first transmission change gear ratio in the first axially displaced position of the first shift bar and to effect engagement of a second transmission gear ratio in the second axially displaced position of the first shift bar and to disengage said first and second gear ratios in the neutral position of the first shift bar, a second shift yoke operatively connected to the second shift bar adjacent the shift bar housing second end and moved thereby to effect engagement of a third transmission change gear ratio in the axially displaced position of the second shift bar and to disengage said third gear ratio in the neutral position of the second shift bar, a first shifting piston slidably and sealing received within the first piston bore and secured to the first shift bar, said first piston defining first and second selectively pressurizable fluid chambers on opposite sides thereof within the first piston bore, a second shifting piston slidably and sealing received within the second piston bore and secured to the second shift bar, said second piston defining a third selectively pressurizable fluid chamber within the second piston bore on a side thereof facing towards the second shift bar, effective upon pressurization thereof to cause the second piston to move the second shift bar axially from the axially displaced position to the neutral position thereof;

at least one channel extending between the first and third fluid chambers providing fluid communication therebetween such that selective pressurization of one of the first and third fluid chambers causes pressurization of the other of the first and third fluid chambers;

an end housing secured to the shift bar housing first end;

a third piston bore extending into the end housing from a side thereof facing towards the shift bar housing first end having a diameter that is larger than the first piston bore diameter;

a third shifting piston slidably and sealingly received within the third piston bore and engaging the first shifting piston, said third piston defining a fourth selectively pressurizable fluid chamber within the third piston bore on a side thereof facing away from the first shifting piston;

a fifth bore extending into the end housing from a side thereof facing towards the shift bar housing, said fifth bore defining a selectively pressurizable fifth fluid chamber in fluid communication with a side of the second shifting piston facing away from the second shift bar;

a plate member disposed intermediate the shift bar housing first end and the end housing, said plate member having a first opening therethrough for enabling engagement between the first and third shifting piston members and having a breadth that is smaller than the third piston bore diameter and having a second opening therethrough enabling the fluid communication between the fifth fluid chamber and the side of the second shifting piston facing away from the second shift bar; and valve means connectable to a pressurized fluid source and operable for selectively pressurizing one or more of the fluid chambers;

said first, second, third, fourth and fifth fluid chambers effective such that:

(a) pressurization of the first, third and fourth chambers causes the third shifting piston and the first shifting piston to move the first shift bar axially to the neutral position thereof and causes the second shifting piston to move the second shift bar axially to the neutral position thereof;

(b) pressurization of the fifth fluid chamber causes the second shifting piston to move the second shift bar axially from the neutral to the displaced position thereof;

(c) pressurization of the second and fourth fluid chambers causes the first shifting piston to move the first shift bar axially to the second displaced position thereof; and (d) pressurization of the first and third fluid chambers causes the first shifting piston to move the first shift bar axially to the first displaced position thereof.

2. A pressurized fluid operated shift bar assembly for a change gear transmission, said assembly comprising:

a shift bar housing having spaced-apart first and second ends;

a first piston bore having a prescribed diameter extending into said shift bar housing from the first end thereof;

an open-ended first shift bar bore extending through the shift bar housing between the first piston bore and the shift bar housing second end;

a second piston bore extending into the shift bar housing from the first end thereof in spaced-apart relationship to said first piston bore and having a prescribed diameter;

an open-ended second shift bar bore extending through the shift bar housing between the second piston bore and the shift bar housing second end in spaced-apart relationship to said first shift bar bore;

a first shift bar extending through the first shift bar bore into the first piston bore from the shift bar housing second end and slidable in axially opposite directions relative thereto, said first shift bar having an axially neutral position and first and second axially displaced positions;

a second shift bar extending through the second shift bar bore into the second piston bore from the shift bar housing second end and slidable in axially opposite directions relative thereto, said second shift bar having an axially neutral position and an axially displaced position;

a first shift yoke operatively connected to the first shift bar adjacent the shift bar housing second end and moved thereby to effect engagement of a first transmission change gear ratio in the first axially displaced position of the first shift bar and to effect engagement of a second transmission gear ratio in the second axially displaced position of the first shift bar and to disengage said first and second gear ratios in the neutral position of the first shift bar, a second shift yoke operatively connected to the second shift bar adjacent the shift bar housing second end and moved thereby to effect engagement of a third transmission change gear ratio in the first axially displaced position of the second shift bar and to disengage said third gear ratio in the neutral position of the second shift bar, a first shifting piston slidably and sealing received within the first piston bore and secured to the first shift bar, said first piston defining first and second selectively pressurizable fluid chambers on opposite sides thereof within the first piston bore, a second shifting piston slidably and sealing received within the second piston bore and secured to the second shift bar, said second piston defining a third selectively pressurizable fluid chamber within the second piston bore on a side thereof facing towards the second shift bar, effective upon pressurization thereof to cause the second piston to move the second shift bar axially from the axially displaced position to the neutral position thereof;

at least one channel extending between the first and third fluid chambers providing fluid communication therebetween such that selective pressurization of one of the first and third fluid chambers causes pressurization of the other of the first and third fluid chambers;

an end housing secured to the shift bar housing first end;

a third piston bore extending into the end housing from a side thereof facing towards the shift bar housing first end having a diameter that is larger than the first piston bore diameter;

a third shifting piston slidably and sealingly received within the third piston bore and engaging the first shifting piston, said third piston defining a fourth selectively pressurizable fluid chamber within the third piston bore on a side thereof facing away from the first shifting piston;

a fifth bore extending into the end housing from a side thereof facing towards the shift bar housing, said fifth bore defining a selectively pressurizable fifth fluid chamber in fluid communication with a side of the second shifting piston facing away from the second shift bar;

sensing means operable to provide a signal indicating when either or both the first and second shaft bars are in their respective neutral positions, said means comprising a first bore extending between the first and second shift bar bores within the shift bar housing, a second bore intersecting said first bore, a sensing member slidably received within said second bore, said sensing member resiliently biased towards said first bore with one end thereof extending partially thereunto, respective grooves in the first and second shift bars that face towards each other and are substantially aligned with said first bore when the first and second shift bars are in their respective neutral positions, a first movable member slidably received within said first bore having one end engaged with one side of said sensing member end extending partially into said first bore and having an opposite end biased thereby into engagement with said first shift bar groove, a second movable member slidably received within said first bore having one end engaged with an opposite side of said sensing member end extending partially into said first bore and having an opposite end biased thereby into engagement with said second shift bar groove, said grooves, first and second movable members and resiliently biased sensing member operable such that aixal movement of the first shift bar causes said first movable member to move said sensing member away from said first bore and axial movement of the second shift bar causes said second movable member to move said sensing member away from said first bore with the respective movement of said sensing member relative respective axial movement of the first and shift bars operable to provide said sensing signal; and valve means connectable to a pressurized fluid source and operable for selectively pressurizing one or more of the fluid chambers;

said first, second, third, fourth and fifth fluid chambers effective such that:

(a) pressurization of the first, third and fourth chambers causes the third shifting piston and the first shifting piston to move the first shift bar axially to the neutral position thereof and causes the second shifting piston to move the second shift bar axially to the neutral position thereof;

(b) pressurization of the fifth fluid chamber causes the second shifting piston to move the second shift bar axially from the neutral to the displaced position thereof;

(c) pressurization of the second and fourth fluid chambers causes the first shifting piston to move the first shift bar axially to the second displaced position thereof; and (d) pressurization of the first and third fluid chambers causes the first shifting piston to move the first shift bar axially to the first displaced position thereof.

3. The assembly of claim 2 including a plate member disposed intermediate the shift bar housing first end and the end housing, said plate member having a first opening therethrough for enabling engagement between the first and third shifting piston members and having a breadth that is smaller than the third piston bore diameter and having a second opening therethrough enabling the fluid communication between the fifth fluid chamber and the side of the second shifting piston facing away from the second shift bar.

4. The assembly of claim 1 or 2 including neutral position locking means within the shift bar housing, said locking means operable to enable the first shift bar to lock the second shift bar in the neutral position thereof when the first shift bar is moved axially from the neutral position thereof and to enable the second shift bar to lock the first shift bar in the neutral position thereof when the second shift bar is moved from the neutral position thereof.

5. The assembly of claim 4 wherein the locking means comprises a bore in the shift bar housing extending between the first and second shift bar bores, a groove in the first shift bar and a groove in the second shift bar that respectively face towards each other and are in alignment with said bore at the respective neutral positions thereof, and a locking member slidably received with said bore, said bore and grooves adapted such that axial movement of the first shift bar from the neutral position thereof urges the locking member into locking engagement with the second shift bar groove preventing movement from the neutral position thereof and movement of the second shift bar from the neutral position thereof urges the locking member into locking engagement with the first shift bar groove preventing movement from the neutral position thereof.

6. The assembly of claim 1 including neutral position sensing means operable to provide a signal indicating when either or both the first and second shift bars are in their respective neutral positions.

7. The assembly of claim 6 wherein the sensing means comprises a first bore extending between the first and second shift bar bores within the shift bar housing, a second bore intersecting said first bore, a sensing member slidably received within said second bore, said sensing member resiliently biased towards said first bore with one end thereof extending partially thereunto, respective grooves in the first and second shift bars that face towards each other and are substantially aligned with said first bore when the first and second shift bars are in their respective neutral positions, a first movable member slidably received within said first bore having one end engaged with one side of said sensing member end extending partially into said first bore and having an opposite end biased thereby into engagement with said first shift bar groove, a second movable member slidably received within said first bore having one end engaged with an opposite side of said sensing member end extending partially into said first bore and having an opposite end biased thereby into engagement with said second shift bar groove, said grooves, first and second movable members and resiliently biased sensing member operable such that axial movement of the first shift bar causes said first movable member to move said sensing member away from said first bore and axial movement of the second shift bar causes said second movable member to move said sensing member away from said first bore with the respective movement of said sensing member relative respective axial movement of the first and shift bars operable to provide said sensing signal as well as when both the first and second shift bars are in their respective neutral positions.

* * * * *